US006943913B1

(12) United States Patent
Jung

(10) Patent No.: US 6,943,913 B1
(45) Date of Patent: Sep. 13, 2005

(54) METHOD FOR ENHANCING THE IMAGE QUALITY OF AN IMAGE FORMING APPARATUS

(75) Inventor: Su-Jong Jung, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 09/611,957

(22) Filed: Jul. 6, 2000

(30) Foreign Application Priority Data

Jul. 7, 1999 (KR) .................................. 99/27215

(51) Int. Cl.[7] ............................................ G06F 15/06

(52) U.S. Cl. ......................... 358/1.2; 358/1.5; 358/1.6; 358/1.9; 358/1.11

(58) Field of Search ........................... 358/1.2, 1.5, 1.6, 358/1.9, 1.11, 451, 474, 296; 399/66, 44, 399/45

(56) References Cited

U.S. PATENT DOCUMENTS 5,223,952 A * 6/1993 Anzai ......................... 358/451
5,809,367 A * 9/1998 Yoo et al. ..................... 399/45
5,822,651 A * 10/1998 Yim et al. .................... 399/66
6,247,788 B1 * 6/2001 Kamei ......................... 347/41

* cited by examiner

*Primary Examiner*—Twyler Lamb
(74) *Attorney, Agent, or Firm*—Robert E. Bushnell, Esq.

(57) ABSTRACT

There is provided a process and an image formation apparatus for enhancing the image quality of an image forming apparatus such as a printer, a facsimile and a complex machine employing an electrophotographic technique, capable of obtaining a good image quality even though the image is formed on a thick paper such as an envelope. The process includes the steps of: storing image data to be printed at a memory if a print demand is received; detecting the kind of paper selected by a user; editing by reducing the number of pixels of the image data at a certain rate if the detected paper is a thick; and transmitting the edited image data to the LSU and performing the printing work for the edited image data.

18 Claims, 5 Drawing Sheets

METHOD FOR ENHANCING THE IMAGE QUALITY OF AN IMAGE FORMING APPARATUS

CLAIM OF PRIORITY

This application makes reference to, incorporates the same herein, and claims all benefits accruing under 35 U.S.C. §119 from an application METHOD FOR ENHANCING THE IMAGE QUALITY OF AN IMAGE FORMING APPARATUS for earlier filed in the Korean Industrial Property Office on the 7th day of the month of July 1999, and there duly assigned Serial No. 27215/1999.

BACKGROUND OF INVENTION

1. Field of the Invention

The present invention relates to image formation process and apparatus generally, and, more particularly, to image formation process and apparatus for enhancing the image quality of images printed on thicker, albeit narrower paper while employing an electrophotographic developing technique.

2. Description of the Related Art

In general, an image forming apparatus that employs an electrophotographic developing technique such as a facsimile, a printer and a complex machine, is equipped with an electrification roller, a photosensitive drum, a transfer roller, a developing roller, a toner supply roller, a fixer and a laser scanning unit (i.e., a "LSU") for printing images onto a printable media such as a cut sheet of paper. I have noticed deficiencies in the pre-transfer system of image forming processes and apparatus. By way of example, if the user intends to form an image on a printable material that is relatively thicker than the standard grade of xerographic paper such as an envelope, the toner coated on the photosensitive drum is not transferred onto the paper and the remaining toner on the photosensitive drum is transferred onto the next piece of printable material that passes along the path conveying the printable material through the apparatus, thereby causing a mis-transfer which is referred to as "ghost phenomenon", because the transfer electric field cannot transmit the thick paper. Moreover, when a thick envelope having a relatively narrower width in comparison to a sheet of A4 or 8½" by 11" paper is used in a transfer system using a conductive roller, in a state wherein a high voltage required for the transfer is applied to the transfer roller, the conductive layer of the photosensitive drum is broken. This defect is frequently referred to as a "pin hole", and occurs in the region (either on the right, the left, or possibly on both sides of the sheet of the printable media) where the transfer roller and the photosensitive drum come into direct contact with each other due to the absence of any intermediate printable media, thereby causing fatal and unrepairable damage to the photosensitive exterior circumferential surface of the drum.

SUMMARY OF THE INVENTION

It is, therefore, a primary object of the present invention to provide an improved image formation process and apparatus.

It is another object to provide an image formation process and apparatus demonstrating an enhancement of image quality of the images formed by the process and the apparatus.

It is still another object to provide an image formation process and apparatus capable of improving transfer efficiency.

It is yet another object to provide an image formation process and apparatus capable of forming a high quality of image on a thicker paper.

It is still yet another object to provide an image formation process and apparatus capable of minimizing damage to the photosensitive drum while printing images upon media that have a width less than the axial length of the photosensitive drum.

It is a further object to provide an image formation process and apparatus capable of for enhancing the image quality of printed images while preventing damage of the photosensitive drum although a transfer roller directly contacts the photosensitive drum in case an image is formed on a thick envelope with a narrow width.

These and other objects may be attained according to the principles of the present invention, with an image formation process and apparatus using either a reduced number of pixels of light emitted from a laser scanning unit, a decreased amount of light or an increased level of developing voltage by faintly treating the image signals generated by a controller.

In accordance with one aspect of the present invention, the process contemplates storing image data to be printed at a memory if a print demand is received; detecting the kind of paper selected by a user; editing by reducing the number of pixels of the image data at a certain rate if the detected paper is a thick; and transmitting the edited image data to the LSU and performing the printing work for the edited image data. The editing step may include equally splitting the pixels of the light scanned into an integer number of pixels in order to represent one pixel of the image data, and editing by using Econo (economy) mode at which only a certain number of pixels among the equally split pixels of the light are scanned. In addition, the editing step may include splitting the print area into a plurality of small areas, and editing by using Ret (resolution enhancement technology) mode at which some pixels among the total pixels for the resolution included in the respective split small areas are removed.

In accordance with another aspect of the present invention, the process contemplates storing image data to be printed at a memory if a print demand is received; detecting the kind of paper selected by a user; transmitting the image data to the laser scanning unit if the detected paper is thick; and decreasing the amount of the light emitted from the laser scanning unit at a predetermined rate and performing the printing work.

In accordance with another aspect of the present invention, the process contemplates storing image data to be printed at a memory if a print demand is received; detecting the kind of paper selected by a user; transmitting the image data to the laser scanning unit if the detected paper is thick; and increasing a developing voltage applied to the developing machine to a predetermined voltage level and then performing the printing work. The predetermined voltage level is equal to or less than −250 volts.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
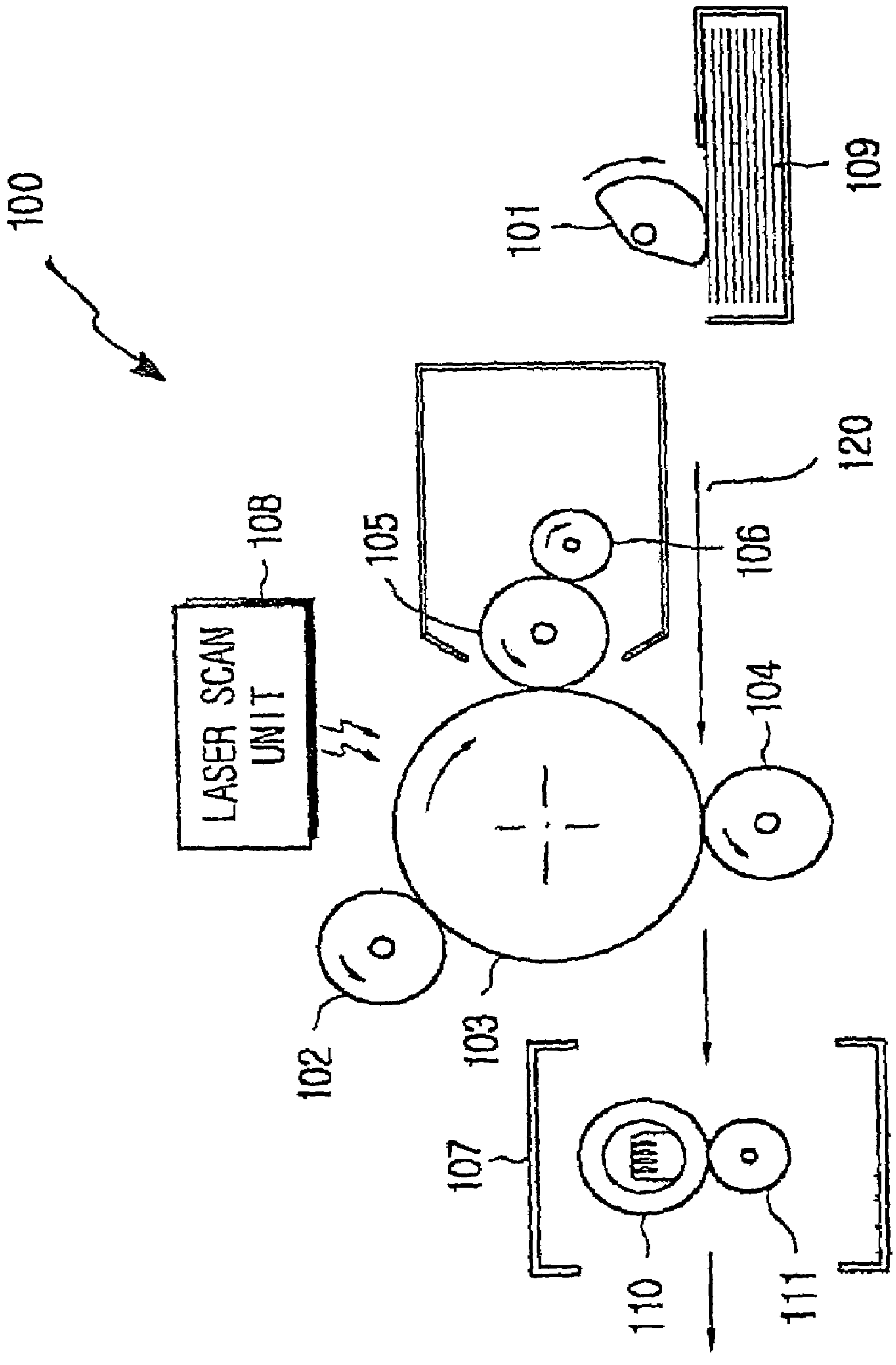
FIG. 1 schematically shows an image forming apparatus employing an electrophotographic developing technique.

Turning now to the drawings, FIG. 1 shows an image forming apparatus 100 such as a facsimile, a printer and a complex machine, employing a electrophotographic developing technique. Image forming apparatus 100 may be constructed with a pick-up roller 101, an electrification roller 102, a photosensitive drum 103, a transfer roller 104, a developing roller 105, a supply roller 106, a fixer 107 and a laser scanning unit ("LSU") 108 for printing certain image data onto a recording medium such as a cut sheet of paper that is withdrawn by pick-up roller 101 from the top side of a stack of cut sheets stored within paper cassette 109, and propelled along a path of conveyance 120 through apparatus 100. During the printing process, the electrification roller 102 uniformly electrifies the photosensitive substance coated on the external surface of the photosensitive drum 103 while rotating, and the light generated from LSU 108 forms an electrostatic latent image that is to be printed, on the electrified photosensitive drum 103. Then, there is a voltage difference between the supply roller 106 to which a higher supply voltage is applied and the developing roller 105 to which a lower voltage is applied. Therefore, negative charges move from the supply roller 106 to the developing roller 105. In this way, toner supplied to the developing roller 105 is coated on the electrostatic latent image formed on the exterior circumferential surface of photosensitive drum 104 to form a visible image. The high voltage of transfer roller 104 causes the visible image formed by the toner coating the surface of the photosensitive drum 103 to be transferred to the recording paper 109 delivered along path 120. After the transfer of the visible image onto the recording paper 109 is fixed on the recording paper 109 by the high temperature and high pressure of a heating roller 110 and the pressure exerted by pressing roller 111 mounted within fixer 107 to engage opposite sides of the recording media, thereby finishing the printing process and discharging a sheet of paper bearing toner particles that form a visible image. This sequence of supplying sheets of paper, developing, transfer and application of electrification voltages is continuously applied to the supply roller 106, the developing roller 105, the transfer roller 104 and the electrification roller 102, respectively until the printing process is completed for each job. The heating roller 110 in the fixer 107 is maintained in a turned-on state until the printing process has been completed.

I have noticed deficiencies in the pre-transfer system of image forming processes and apparatus. By way of example, if the user intends to form an image on a printable material that is relatively thicker than the standard grade of xerographic paper such as an envelope, the toner coated on the photosensitive drum is not transferred onto the paper and the remaining toner on the photosensitive drum is transferred onto the next piece of printable material that passes along path 120, thereby causing a mis-transfer which is referred to as "ghost development", because the transfer electric field cannot transmit the thick paper. Moreover, when a thick envelope having a relatively narrower width in comparison to a sheet of A4 or 8½" by 11" paper is used in a transfer system using a conductive roller, in a state wherein a high voltage required for the transfer is applied to the transfer roller, the conductive layer of the photosensitive drum is broken. This defect is frequently referred to as a "pin hole", and occurs in the region (either on the right, the left, or possibly on both sides of the sheet of the printable media) where the transfer roller and the photosensitive drum come into direct contact with each other due to the absence of any intermediate printable media, thereby causing fatal and unrepairable damage to the photosensitive exterior circumferential surface of drum 103.

Figure 2:
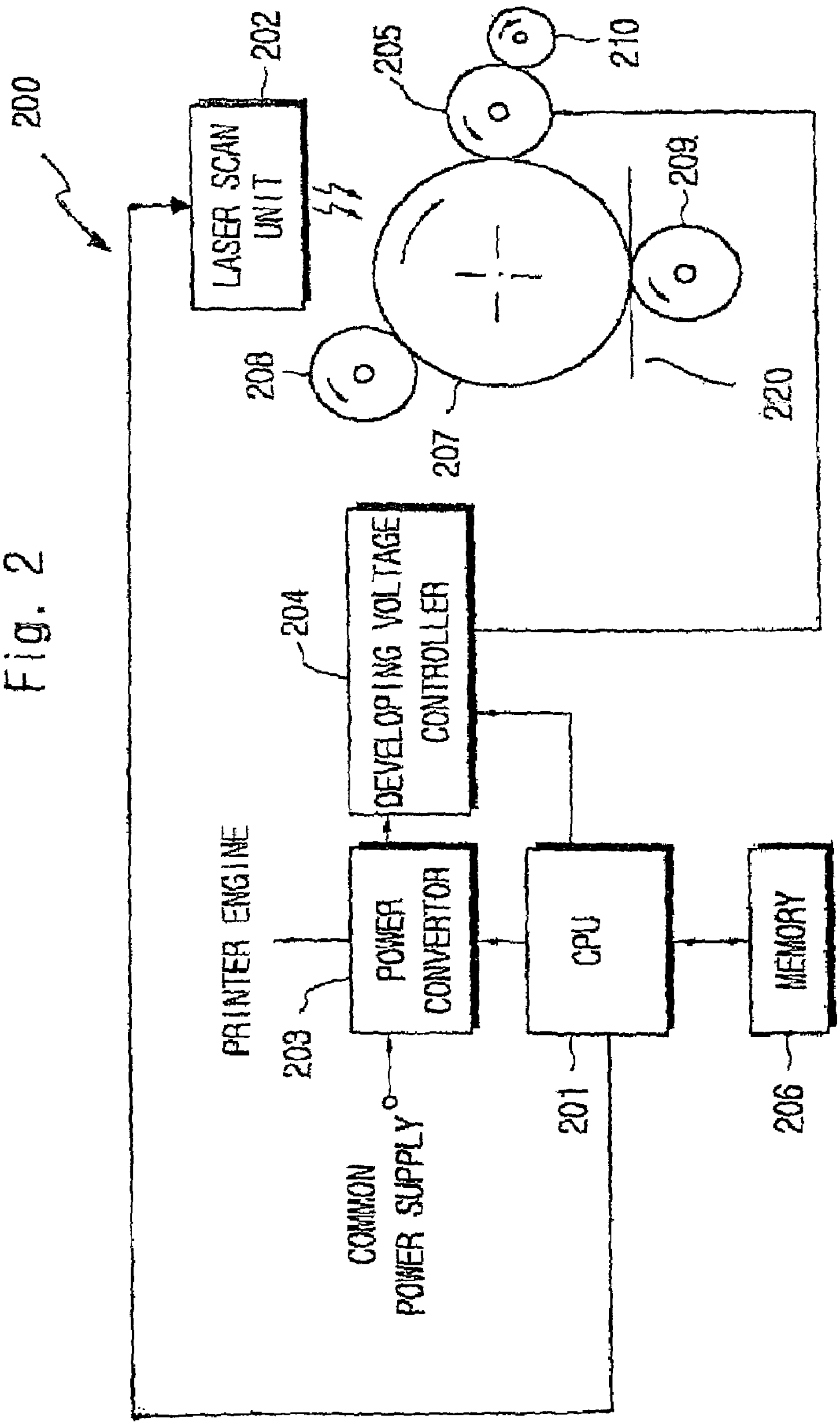
FIG. 2 is a schematic block diagram of an image forming apparatus constructed according to the principles of the present invention.

Referring now to FIG. 2, a preferred embodiment of the present invention may be implemented with an image forming apparatus 200 constructed with a central processing unit ("CPU") 201 for controlling the image forming apparatus pursuant to a given operational program as a whole. In particular, central processing unit 201 controls the function block in the image forming apparatus in accordance with the particular kind of paper selected by a user of apparatus 200, thereby enhancing the image quality. In other words, central processing unit 201 attenuates, or "faints" the image information derived from image data received from an external source such as a computer, a document scanner, or a telephone wire, and applies the image information to a laser scanning unit ("LSU") 202 faintly by either reducing the number of pixels of light emitted from the LSU 202, or by increasing the magnitude of the developing voltage when the user selects a thick paper, thereby enhancing the transfer efficiency. Power convertor 203 receives the common household line voltage, i.e., either 110 volts or 220 volts, transforms the line voltage to a voltage level required at each function block in the image forming apparatus, and then supplies the transformed voltage to each function block under the control of central processing unit 201.

Developing voltage controller 204 controls the developing voltage applied to developing roller 205 under the control of central processing unit 201. That is, developing voltage controller 204 increases the developing voltage level applied to the developing roller 205 from −300 volts to −250 volts or more under the control of central processing unit 201, in accordance with the kind of printable medium (e.g., a cut sheet of xerographic grade paper) detected by central processing unit 201, in response to either a manual input by a user or a signal supplied by a sensor (e.g., a sensor deployed to detect passage of paper through a bypass tray or a paper thickness sensor) located along the path 220 of conveyance through apparatus 200.

A memory 206 stores various operational programs for controlling image forming apparatus 200 through the central processing unit 201 as well as the image data to be printed by the image forming apparatus 200. Laser scanning unit ("LSU") 202 scans signals of light corresponding to the image data selected by the user to be printed onto the printable medium, in order to form electrostatic latent images on the exterior circumferential surface of photosensitive drum 207. Electrification roller 208 electrifies the surface of the photosensitive drum 207 at a constant potential with a high electrification voltage (−1.4 kilo-volts) drawn from power convertor 203. The supply roller 210 supplies the particles of toner drawn from the hopper of a toner container to developing roller 205 while rotating in contact with developing roller 205. A developing roller 205 applies the toner supplied by supply roller 210 to the electrostatic latent image on the photosensitive drum 207 while contacting the photosensitive drum at a constant pressure to form a visible image on the photosensitive exterior circumferential surface of drum 207. Transfer roller 209 is electrified with a high transfer voltage (+1.5 kilovolts) drawn from power convertor 203, and transfers the toner coated onto the photosensitive exterior circumferential surface of drum 207 to the printable medium delivered paper along path 220 while rotating in contact with the photosensitive drum 207 at a constant pressure.

The operation of each of the several embodiments according to the practice of the principles of the present invention including such an arrangement will now be described.

The First Embodiment

Figure 3:
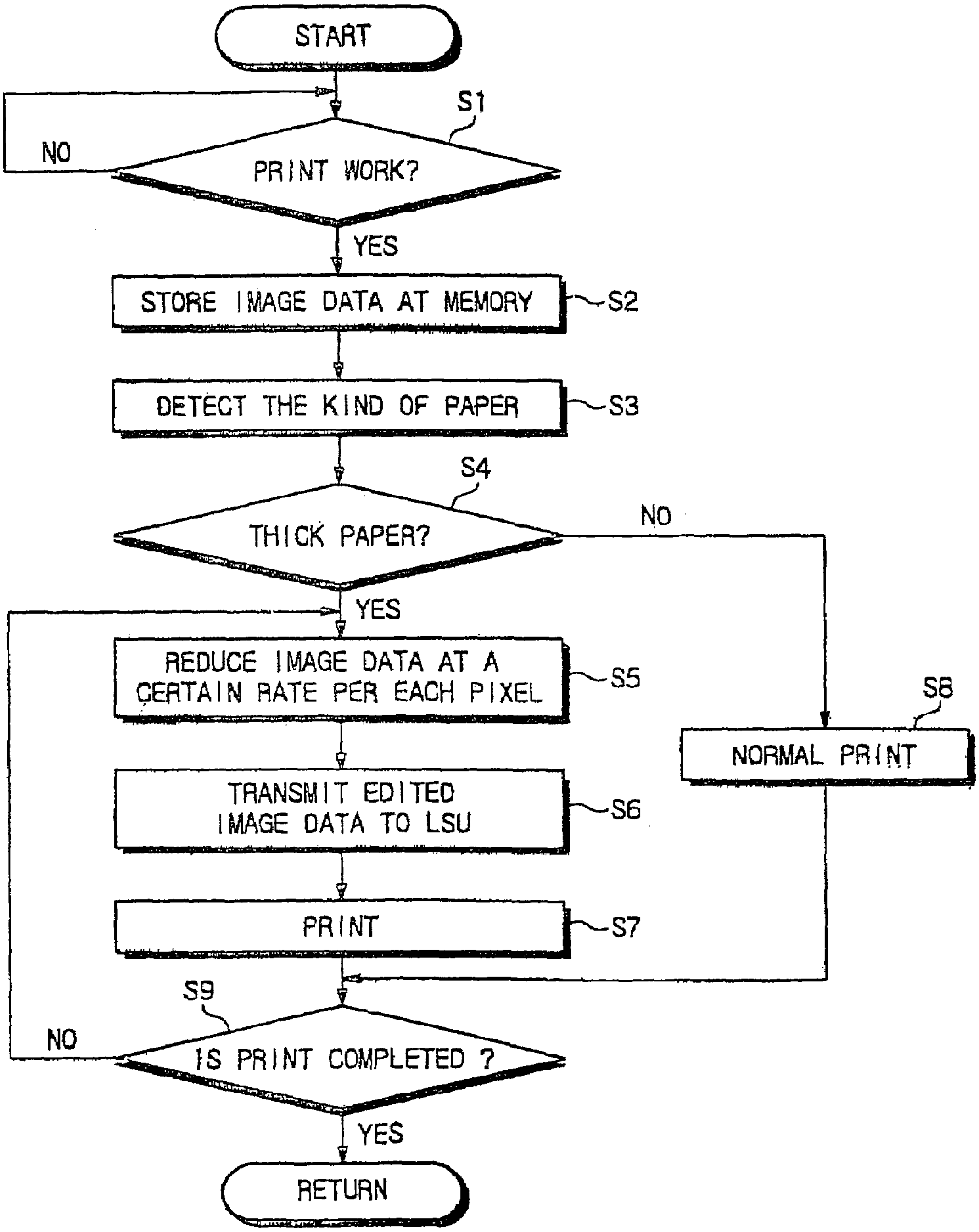
FIG. 3 is a flow chart showing the first embodiment of a process for enhancing the image quality of the image forming apparatus according to the principles of the present invention.

FIG. 3 shows in a flow chart, one of the processes for enhancing the image quality of the image forming apparatus according to the practice of the instant principles, as a first embodiment of the present invention. When a print work is selected by a user (step S1), central processing unit 201 stores within memory 206 image data transmitted from a computer or other external equipment (step S2), and detects the kind of paper selected by the user (step S3). If the grade of paper selected by the user at step S3 is determined to be a thicker stock of paper (step 4), central processing unit 201 performs an editing function to reduce the image data to be printed at a certain rate per each pixel (step S5), and transmits the edited image data to the laser scanning unit 202 (step S6) and performs the print work for the edited image data (step S7) by creating the image corresponding to the image information onto the surface of the printable media. If the grade of paper selected at step S3 is determined during step S4 to not be a thicker type of paper, central processing unit performs a normal printing work (step S8). Then, central processing unit 201 determines whether or not the printing work should be completed (step S9), and if additional printing is determined by step S9 to be required for that job, central processing unit 201 proceeds to repeat all of the process after step S5, or if step S9 determines that the print job has been completed, central processing unit 201 finishes the printing process.

Although there are various processes for the editing work, only two representative cases, that are used in the printing work, are described herein. At a print mode, "Econo mode" and "Ret mode" are present in various setting functions. The "Econo mode" is a process wherein, in order to represent one pixel of the image data, the number of pixels of the light scanned is split into an integer number N by laser scanning unit 202, and only certain areas among the number of pixels of light split uniformly are emitted, thereby reducing the overall number of pixels to be illuminated. This means that since the number of pixels of light emitted by light scanning unit 202 is less than the number of pixels of light to be emitted for printing actual data during a normal printing mode, the total amount of toner to be used during the printing is deceased and, therefore, the amount of toner coated onto the photosensitive exterior circumferential surface of drum 207 from the developing roller 205 is decreased. Accordingly, even though the transfer potential is low due to the reduced amount of the toner coated onto the photosensitive drum 207, an adequate quantity of toner to define the image to be printed can be transferred on the paper.

On the other hand, the "Ret mode" is a process wherein the print areas are split into a plurality of small areas, and some of total pixels per each resolution in the respective split small areas are removed. This mode is substantially similar to the "econo mode" in terms of both the constitution and the effect.

The Second Embodiment

Figure 4:
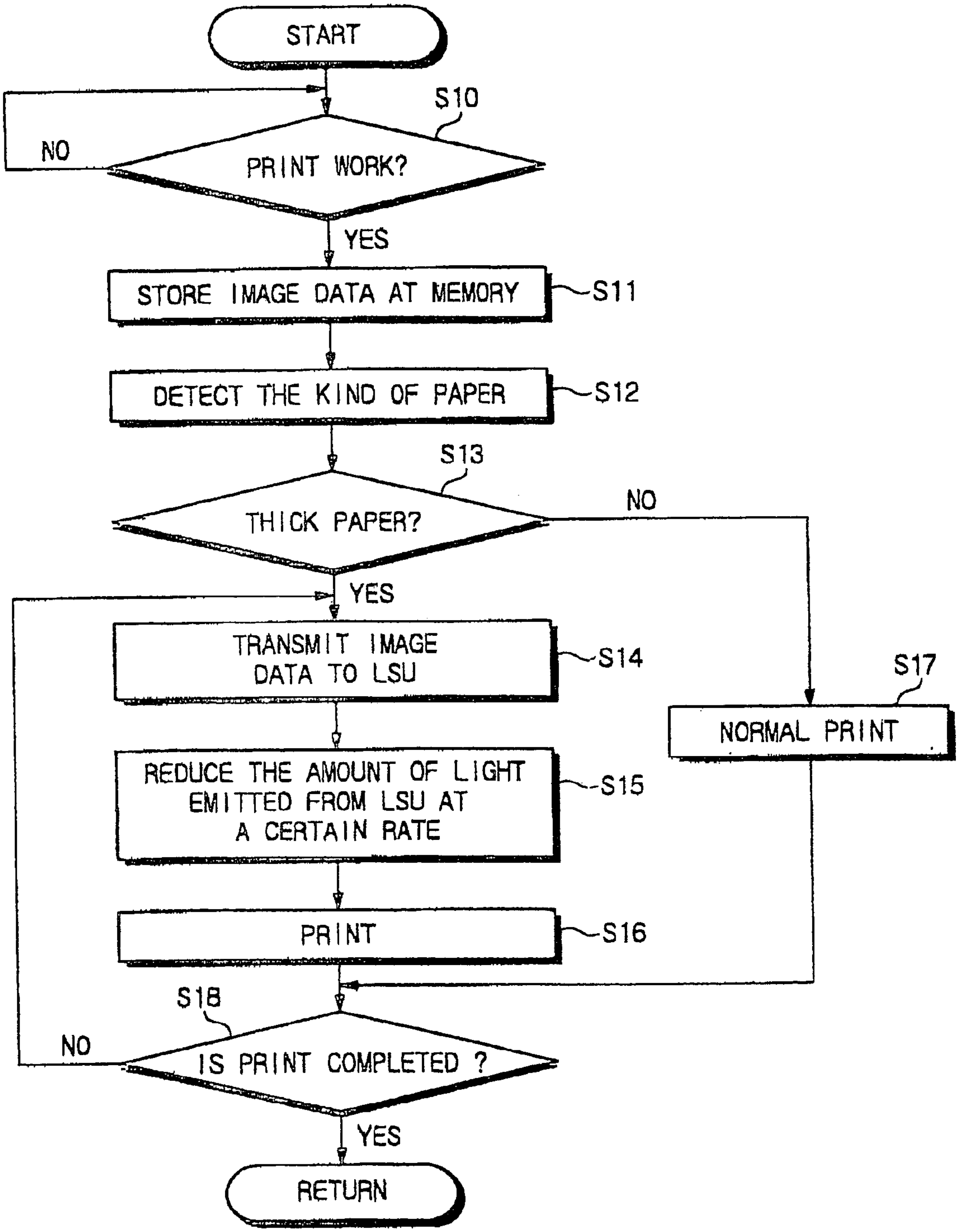
FIG. 4 is a flow chart showing the second embodiment of a process for enhancing the image quality of the image forming apparatus according to the principles of the present invention.

FIG. 4 shows a flow chart for a process of enhancing the image quality of printed images in accordance with the second embodiment of the present invention. In FIG. 4, for the convenience of explanation, illustrates some of the same steps as shown in FIG. 3. When a print work is selected by a user (step S10), central processing unit 201 stores within memory 206 image data transmitted from a computer or other external equipment (step S11), and detects the grade and type of paper selected by the user (step S12). If the grade and type of paper selected by the user at step S12 is a thicker paper (step 13), central processing unit transmits image data to be printed to the light scanning unit 202 (step S14), and controls light scanning unit 202 to reduce the amount of the light emitted from light scanning unit 202 onto the photosensitive exterior circumferential surface of drum 103 at a certain rate (step S15), and then performs the print work with the reduced amount of the light (step S16).

If the kind of paper selected at step S3 is not a thick paper, central processing unit performs a normal printing work (step S17). Then, central processing unit 201 determines whether or not the printing work is completed (step 18), and if not, proceeds all the steps after step S14, or if completed, finishes the printing process. That is, since the amount of the light emitted from the light scanning unit 202 is less than the actual amount of the light to be emitted for printing data, the electrification potential of the photosensitive drum 207 is not sufficiently low. This means that the engagement force of the toner coated on the surface of the photosensitive drum 207 is lowered. Therefore, even though the transfer potential is low due to the low engagement force of the toner transmitted from the developing roller 205 and coated on the photosensitive drum 207, sufficient toner is transferred onto the sheet of paper conveyed along path 220.

The Third Embodiment

Figure 5:
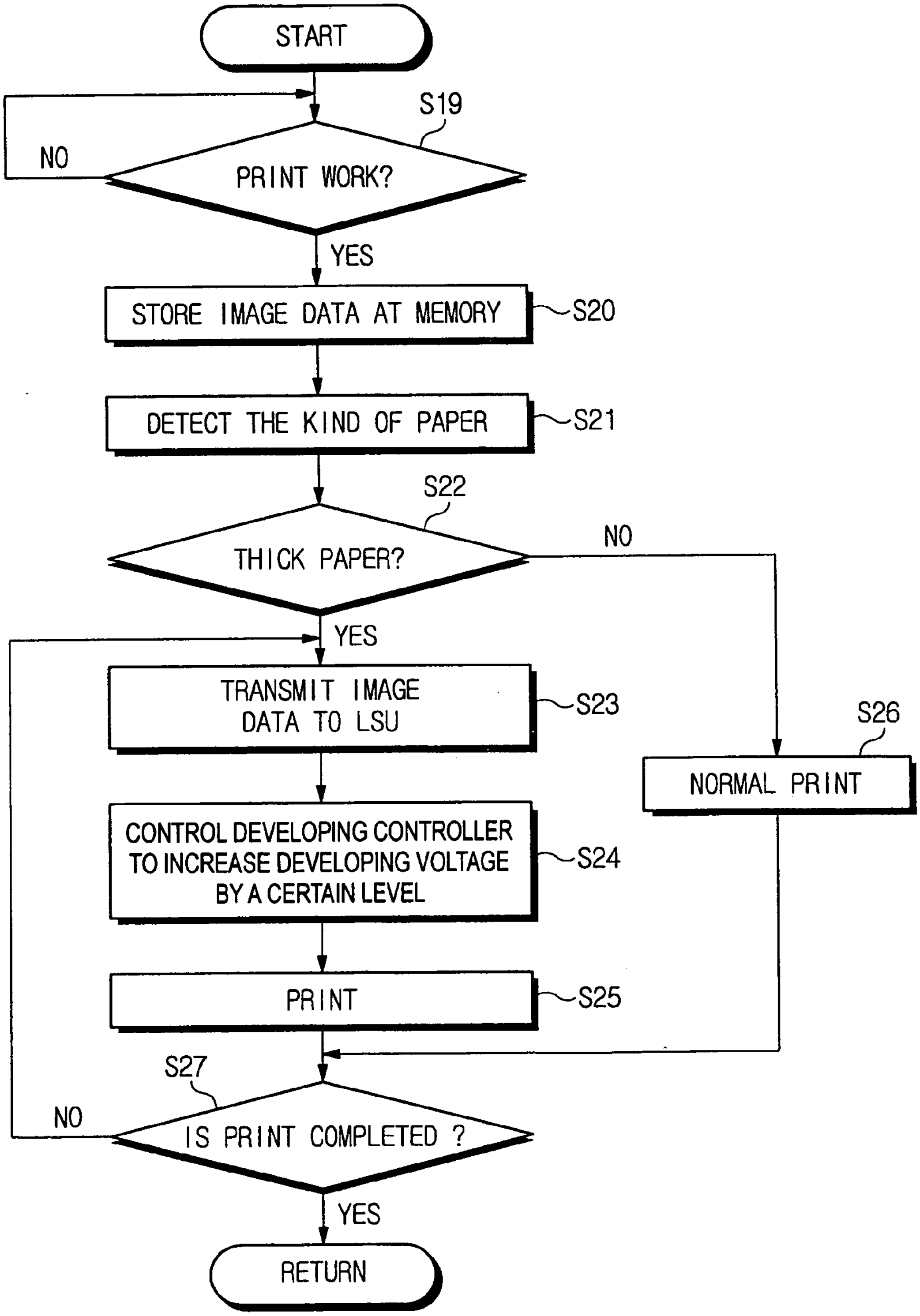
FIG. 5 is a flow chart showing the third embodiment of a process for enhancing the image quality of the image forming apparatus according to the principles of the present invention.

FIG. 5 shows a flow chart of a process for enhancing the image quality in accordance with the third embodiment of the present invention. In FIG. 5, for the convenience of explanation, some of the same steps employed in the processes of FIGS. 3 and 4 are described. When a print work is selected by a user during step S19, central processing unit 201 stores within memory 206 image data transmitted from a computer, page or line scanner, telephone line, facsimile machine, or other external equipment (step S20), and detects the weight, type, quality, grade, thickness or kind of paper selected by the user during step S21. If the grade of paper selected by the user at step S21 is determined during step S22 to be a thicker grade of paper stock, central processing unit transmits image data to be printed to the laser scanning unit 202 (step S23), and controls the developing voltage controller 204 to increase the developing voltage by a certain level (step S24), and in step S25 performs the printing work with the toner transmitted to the photosensitive drum 207 according to the increased developing voltage.

If the grade of paper selected at step S21 is determined during step S22 to not be a thicker grade of paper, central processing unit 201 performs a normal printing job during step S26. Then, in step S27, central processing unit 201 determines whether or not the printing work is completed, and if not, repeats all the steps after step S23, or if completed, stops the process.

When in the normal state, the developing voltage is maintained at about −300 V, the potential of the surface of the photosensitive exterior circumferential surface of drum 207 illuminated by the light scanned from the laser scanning unit 202 is maintained at about −50 volts. At that time, there is generated a voltage difference of about −250 volts between the developing voltage of the developing roller 205 and the surface potential of photosensitive drum 207 so that a large amount of toner is transferred onto the photosensitive exterior circumferential surface of drum 207 from developing roller 205. If central processing unit 201 determines during step S22 that a thicker grade of paper has been selected by the user, when the developing voltage is increased below about −250 volts, if a voltage difference of about −200 volts or less is created between the developing voltage of developing roller 205 and the surface potential of the photosensitive drum 207, the amount of the toner transmitted to the photosensitive drum 207 from the developing roller 205 is reduced to less than the amount of the toner transferred during normal printing jobs using a normal grade (e.g, 20 pound cut sheets) of paper. Accordingly, although the transfer voltage is low due to the reduction in the quantity of toner coated onto photosensitive drum 207, the quantity of toner that is transferred is still sufficient to be transferred and form sharply defined images onto the paper selected by the user.

The process for enhancing the image quality of the image forming apparatus in accordance with the principles of the present invention endows image formation with notable advantages. That is, in case that the image forming work is performed for a thicker stock of paper, by reducing the number of pixels of the light emitted from laser scanning unit 202 and enabling a reduction in the quantity of toner to be coated onto the photosensitive surface of drum 207, the transfer efficiency and hence the image quality are enhanced. Moreover, by decreasing the amount of the light emitted by laser scanning unit 202 and lowering the engagement force of the toner coated onto the photosensitive surface of drum 207, the transfer efficiency and hence the image quality of the resulting printed item are enhanced. In addition, by increasing the developing voltage by a certain level and reducing the quantity of toner transferred from developing roller 205 and coated onto the photosensitive surface of drum 207, the transfer efficiency and hence the image quality are enhanced.

Although the invention has been shown and described with respect to the preferred embodiments according to the present invention, it will be understood by those skilled in the art that various changes and modifications may be made without departing from the spirit and scope of the invention as defined in the following claims. Although specific components of the circuit are exemplified herein, it is apparent to those skilled in the art that it is not intended to limit the present invention and that the present invention may be practiced without the specific components. Further, the detailed explanations on the related known functions or constitutions, which may render the subject matter of the present invention vague or unclear, are omitted herein. Therefore, the present invention should not be limited to the described embodiments and is defined by the appended claims and the equivalent thereof.

What is claimed is:

1. A process for controlling in an image forming apparatus, the image forming apparatus comprising an electrification roller electrifying a surface of a photosensitive drum, a laser scanning unit forming an electrostatic latent image on the surface of the photosensitive drum, a developing machine making the electrostatic latent image visible, a transfer roller transferring the image to a recording paper and a fixer fixing the image transferred to the recording paper, the process comprising the steps of:
- storing within a memory image data to be printed when a print demand is received;
- detecting the kind of paper selected by a user;
- editing by reducing the number of pixels of the image data at a certain rate when the detected paper is thicker than a certain thickness; and
- transmitting the edited image data to the laser scanning unit and performing the printing work for the edited image data.

2. The process according to claim 1, wherein the editing step is performed using economy mode in which the pixels of the light scanned are equally split into an integer number of pixels in order to represent one pixel of the image data, and only a certain number of pixels among the equally split pixels of the light are scanned.

3. The process according to claim 1, wherein the editing step is performed using resolution enhancement technology mode in which the print area is split into a plurality of small areas, and some pixels among the total pixels for each resolution included in the respective small areas are removed.

4. A process for controlling in an image forming apparatus, the image forming apparatus comprising a electrification roller electrifying a surface of a photosensitive drum, a laser scanning unit forming an electrostatic latent image on the surface of the photosensitive drum, a developing machine making the electrostatic latent image visible, a transfer roller transferring the image to a recording paper and a fixer fixing the image transferred to the recording paper, the process comprising the steps of:
- storing at a memory image data to be printed when a print demand is received;
- detecting the kind of paper selected by a user;
- transmitting the image data to the laser scanning unit when the detected paper is a thick; and
- decreasing the amount of the light emitted from the laser scanning unit at a predetermined rate and performing the printing work.

5. A process for controlling in an image forming apparatus, the image forming apparatus comprising a electrification roller electrifying a surface of a photosensitive drum, a laser scanning unit forming an electrostatic latent image on the surface of the photosensitive drum, a developing machine making the electrostatic latent image visible, a transfer roller transferring the image to a recording paper and a fixer fixing the image transferred to the recording paper, the process comprising the steps of:
- storing image data to be printed at a memory when a print demand is received;
- detecting the kind of paper selected by a user;
- transmitting the image data to the laser scanning unit when the detected paper is a thick; and increasing a developing voltage applied to the developing machine to a predetermined voltage level and then performing the printing work.

6. A process according to claim 5, wherein the predetermined voltage level is equal to or less than −250 volts.

7. A process in an image forming apparatus, comprising:

storing within a memory image data to be printed on a printable medium by said image forming apparatus;

making a determination of whether a grade of the printable medium selected by a user of said image forming apparatus has a first thickness or has a second and greater thickness;

electrifying a surface of a photosensitive drum;

when said determination establishes that the printable medium selected has said second and greater thickness, editing said image data by reducing to a reduced number of pixels, a quantity of pixels representing said image data, and driving a laser scanning unit to form an electrostatic latent image on said surface of said photosensitive drum in correspondence with said reduced number of pixels;

driving a developer to convert said electrostatic latent image into a visible image;

driving a transfer roller to transfer said visible image to the printable medium selected; and fixing said visible image transferred to the printable medium selected.

8. The process according to claim 7, further comprised of:

generating said edited data by equally dividing said quantity of pixels into an integer number of pixels with each said integer number of pixels representing a different pixel of said image data; and scanning onto said surface of said photosensitive drum only a certain number of pixels among each said integer number of pixels.

9. The process according to claim 7, further comprised of editing said image data by:

dividing said print area into a plurality of smaller areas each exhibiting a corresponding resolution and each represented by a different group of said quantity of pixels; and removing some of said pixels from within each said group.

10. The process according to claim 9, further comprising of when said determination establishes that the printable medium selected has said first thickness, performing a normal printing work without editing said image data by not reducing the number of pixels, the quantity of pixels representing said image data.

11. A process in an image forming apparatus, comprising:

storing within a memory image data to be printed on a printable medium by said image forming apparatus;

making a determination of whether a grade of the printable medium selected by a user of said image forming apparatus has a first thickness or has a second and greater thickness;

electrifying a surface of a photosensitive drum;

when said determination establishes that the printable medium selected has said second and greater thickness, transmitting said image data to a laser scanning unit and forming an electrostatic latent image on said surface of said photosensitive drum after decreasing an amount of light emitted by said laser scanning unit at a predetermined rate;

driving a developer to convert said electrostatic latent image into a visible image;

driving a transfer roller to transfer said visible image to the printable medium selected; and fixing said visible image transferred to the printable medium selected.

12. The process according to claim 11, further comprising of lowering an engagement force of a toner coated onto the photosensitive surface of said photosensitive drum.

13. A process for controlling in an image forming apparatus, comprising:

storing within a memory image data to be printed on a printable medium by said image forming apparatus;

making a determination of whether a grade of the printable medium selected by a user of said image forming apparatus has a first thickness or has a second and greater thickness;

electrifying a surface of a photosensitive drum;

transmitting said image data to a laser scanning unit and forming an electrostatic latent image on said surface of said photosensitive drum;

driving a developer to convert said electrostatic latent image into a visible image by applying a first developing voltage to a developing roller when said determination indicates that the printable medium selected has said first thickness, and by applying a second developing voltage exhibiting a greater magnitude than said first voltage to said developing roller when said determination indicates that the printable medium selected has said second and greater thickness;

driving a transfer roller to transfer said visible image to the printable medium selected; and fixing said visible image transferred to the printable medium selected.

14. A process according to claim 13, further comprised of said second developing voltage being equal to or less than −250 volts.

15. An image forming apparatus, comprising:

a memory storing image data to be printed on a printable medium by said image forming apparatus;

a photosensitive drum bearing an exterior circumferential surface, positioned along a path of conveyance of a printable medium selected by a user through said image forming apparatus;

an electrification roller positioned to electrify said surface of said photosensitive drum;

a controller responding to passage of a printable medium along said path by making a determination of whether a grade of the printable medium selected by a user of said image forming apparatus has a first thickness or has a second and greater thickness, when said determination establishes that the printable medium selected has said second and greater thickness, editing said image data by reducing to a reduced number of pixels, a quantity of pixels representing said image data, and driving a laser scanning unit to form an electrostatic latent image on said surface of said photosensitive drum in correspondence with said reduced number of pixels;

a laser scanning unit forming an electrostatic latent image on said surface of said photosensitive drum in accordance with output data received from said controller;

a developer disposed to convert said electrostatic latent image into a visible image;

a transfer roller disposed along said path opposite from said photosensitive drum, driven to transfer said visible image to the printable medium selected; and a fixing unit positioned along said path to fix said visible image transferred to the printable medium selected.

16. The apparatus according to claim 15, further comprised of said controller editing said image data by generating said edited data by equally dividing said quantity of pixels into an integer number of pixels with each said integer number of pixels representing a different pixel of said image data, and scanning onto said surface of said photosensitive drum only a certain number of pixels among each said integer number of pixels.

17. The apparatus according to claim 15, further comprised of said controller editing said image data by dividing said print area into a plurality of smaller areas each exhibiting a corresponding resolution and each represented by a different group of said quantity of pixels, and removing some of said pixels from within each said group.

18. The process according to claim 5, with the increasing of the developing voltage level being applied to a developing roller in accordance with the kind of paper being detected.

* * * * *